United States Patent [19]

Yoneda et al.

[11] Patent Number: 5,175,680
[45] Date of Patent: Dec. 29, 1992

[54] SYNCHRONIZING CONTROL APPARATUS

[75] Inventors: Takao Yoneda, Nagoya; Toshihiro Yonezu, Nishio, both of Japan

[73] Assignee: Toyoda Koki Kabushiki Kaisha, Kariya, Japan

[21] Appl. No.: 487,449

[22] Filed: Mar. 2, 1990

[30] Foreign Application Priority Data

Mar. 2, 1989 [JP] Japan ................................. 1-50485
Mar. 10, 1989 [JP] Japan ................................. 1-58563

[51] Int. Cl.⁵ ........................................... G05B 11/32
[52] U.S. Cl. ............................... 364/176; 364/474.35; 318/85; 318/625; 318/632
[58] Field of Search ....................... 364/474.11, 474.16, 364/474.19, 474.34, 474.35, 474.12, 176, 177; 318/563, 565, 567, 569, 632, 625, 85, 611, 615-617, 571, 675

[56] References Cited

U.S. PATENT DOCUMENTS

| | | | |
|---|---|---|---|
| 4,000,449 | 12/1976 | Gripp | 318/85 |
| 4,196,376 | 4/1980 | Harvest et al. | 318/78 |
| 4,379,987 | 4/1983 | Kohzai et al. | 318/563 |
| 4,499,546 | 2/1985 | Kuga et al. | 364/474.35 |
| 4,524,313 | 6/1985 | Kuno et al. | 364/184 |
| 4,543,625 | 9/1985 | Nozawa et al. | 364/474.16 |
| 4,554,774 | 11/1985 | Miyashita et al. | 53/73 |
| 4,631,684 | 12/1986 | Akasofa et al. | 364/474.19 |
| 4,682,089 | 7/1987 | Tamari | 364/474.19 |
| 4,761,597 | 8/1988 | Sasaki et al. | 318/625 |
| 4,902,951 | 2/1990 | Ohta et al. | 364/474.35 |
| 4,906,908 | 3/1990 | Papiernik et al. | 364/474.35 |
| 4,967,124 | 10/1990 | Hirai | 318/565 |
| 4,983,899 | 1/1991 | Komatsu et al. | 364/474.11 |
| 4,988,937 | 1/1991 | Yoneda et al. | 318/675 |
| 4,999,557 | 3/1991 | Inoue | 318/611 |
| 5,047,702 | 9/1991 | Hanaki et al. | 318/625 |

*Primary Examiner*—Jerry Smith
*Assistant Examiner*—Thomas E. Brown
*Attorney, Agent, or Firm*—Oblon, Spivak, McClelland, Maier & Neustadt

[57] ABSTRACT

A synchronizing control apparatus for synchronously rotating master and slave main spindles of a pin grinder, wherein a servomotor for the slave main spindle is rotated at a speed corresponding to a compensated command value while the master main spindle is rotated at a speed corresponding to a noncompensated command value. The compensated command value is calculated based on a synchronizing error between the master and slave main spindles at a predetermined interval longer than the length of instable condition of a servo loop for the slave main spindle. When the synchronizing error is larger than a predetermined limit value, the command value for the slave main spindle is gradually compensated in order to prevent the compensated command value from changing too abruptly.

8 Claims, 5 Drawing Sheets

SYNCHRONIZING CONTROL APPARATUS

BACKGROUND OF THE INVENTION

1. Field of the Invention

The present invention relates to a synchronizing control apparatus capable of synchronously rotating two rotary spindles. More particularly, it relates to a synchronizing control apparatus which is used in a machine tool, for example, a pin grinder for a crankshaft of an engine, wherein two main spindles supporting a workpiece are synchronously rotated.

2. Discussion of the Prior Art

In a prior pin grinder of this kind, left side main spindle and right side main spindle supporting a workpiece are mechanically connected each other through a synchronizing shaft in order to be synchronously rotated.

In the pin grinder, however, it is difficult to transmit the same driving power to the workpiece from the two main spindles, because transmission losses in drive trains which transmit a driving power from a drive motor to respective main spindles are different each other. Namely, the transmission loss in one of the drive trains which transmits the driving power directly to one of the main spindles is smaller than the transmission loss in the other drive train which transmits the driving power to the other main spindle via the synchronizing shaft. Further, it is difficult to perfectly synchronize the two main spindles due to backlashes of gears and the like in the drive trains. Therefore, the prior pin grinder has a difficulty in improving the dimensional accuracy and surface roughness of machined workpieces.

On the other hand, an apparatus is known, wherein master and slave rotary spindles, which are mechanically separated, are driven by a pair of servomotors each provided with a position sensor for detecting angular positions thereof. In this apparatus, the command signals, which are the same in principle, are applied to a pair of drive circuits driving respective servomotors in order to rotate the two rotary spindles synchronously. When a synchronous error, i.e., a rotational position difference between the master and slave spindles is produced, the command signal for the slave spindle is compensated based upon the synchronizing error in order to reduce the synchronizing error. The compensation of the command signal is executed whenever the command signals are output to the drive circuits.

If the electrical synchronizing apparatus is used in a pin grinder in order to rotate two main spindles, it is possible to eliminate the aforementioned problems related to the mechanical synchronization. However, the pin grinder provided with the electrical synchronizing apparatus has a problem of instability which occurs due to an interference of driving powers from the pair of servomotors. Since the pair of servomotors driving the pair of main spindles are connected with each other through a workpiece, whose both end are secured to respective main spindles, the driving power transmitted from one of the servomotors to the workpiece is transmitted to the other servomotor through the workpiece, so that the driving powers from the pair of servomotors interfere each other. Accordingly, it is required to accurately synchronize the master and slave main spindles even if the driving powers from the pair of servomotors interfere with each other. The control apparatus described above, however, does not take the driving power interference into account. Therefore, the command signal for the slave spindle is too often and too abruptly compensated so that instable conditions such as hunting motion of the main spindles continues for a long period if such instable conditions occur.

SUMMARY OF THE INVENTION

Accordingly, it is an object of the present invention to provide an improved synchronizing control apparatus capable of realizing a stable synchronizing control for two rotary spindles such as main spindles of a pin grinder.

Another object of the present invention is to provide an improved synchronizing control apparatus capable of eliminating hunting conditions, which cause an instable condition of the control apparatus.

A further object of the present invention is to provide a improved synchronizing control apparatus capable of minimizing the synchronizing error between two rotary spindles, thereby enabling the control apparatus to accurately synchronize the two rotary spindles.

Briefly, in a synchronizing control apparatus according to the present invention, there is provided with synchronizing error detecting means for detecting a synchronizing error between the two rotary spindles, which are not mechanically connected, and control means for applying a command signal to a drive circuit for one of the two rotary spindles (master spindle) and for applying a compensated command signal to a drive circuit for the other of the two rotary spindles (slave spindle). The compensated command signal is calculated based upon the command signal and a synchronizing error at an interval that is longer than the length of instable condition of the servo loop of the other rotary spindle (slave spindle), which occurs after a new command signal being applied. With this configuration, hunting conditions of the servo loop can be eliminated, thereby the stability of the control apparatus being increased.

In another aspect of the present invention, the control apparatus is provided with comparing means for comparing the detected synchronizing error with a predetermined limit value; limiting means for regarding the synchronizing error as a final compensation adding value when the synchronizing error is smaller that the limit value and for regarding the limit value as the final compensation adding value when the synchronizing error is larger than the limit value; and compensation value calculating means for adding the final compensation adding value to a previous compensation value to obtain a new compensation value. Accordingly, the compensated command signal applied to the other rotary spindle (slave spindle) is gradually varied even if the synchronizing error between the two rotary spindles suddenly increases, thereby instable conditions which is caused due to abrupt changes of the compensation value being eliminated.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

Figure 1:
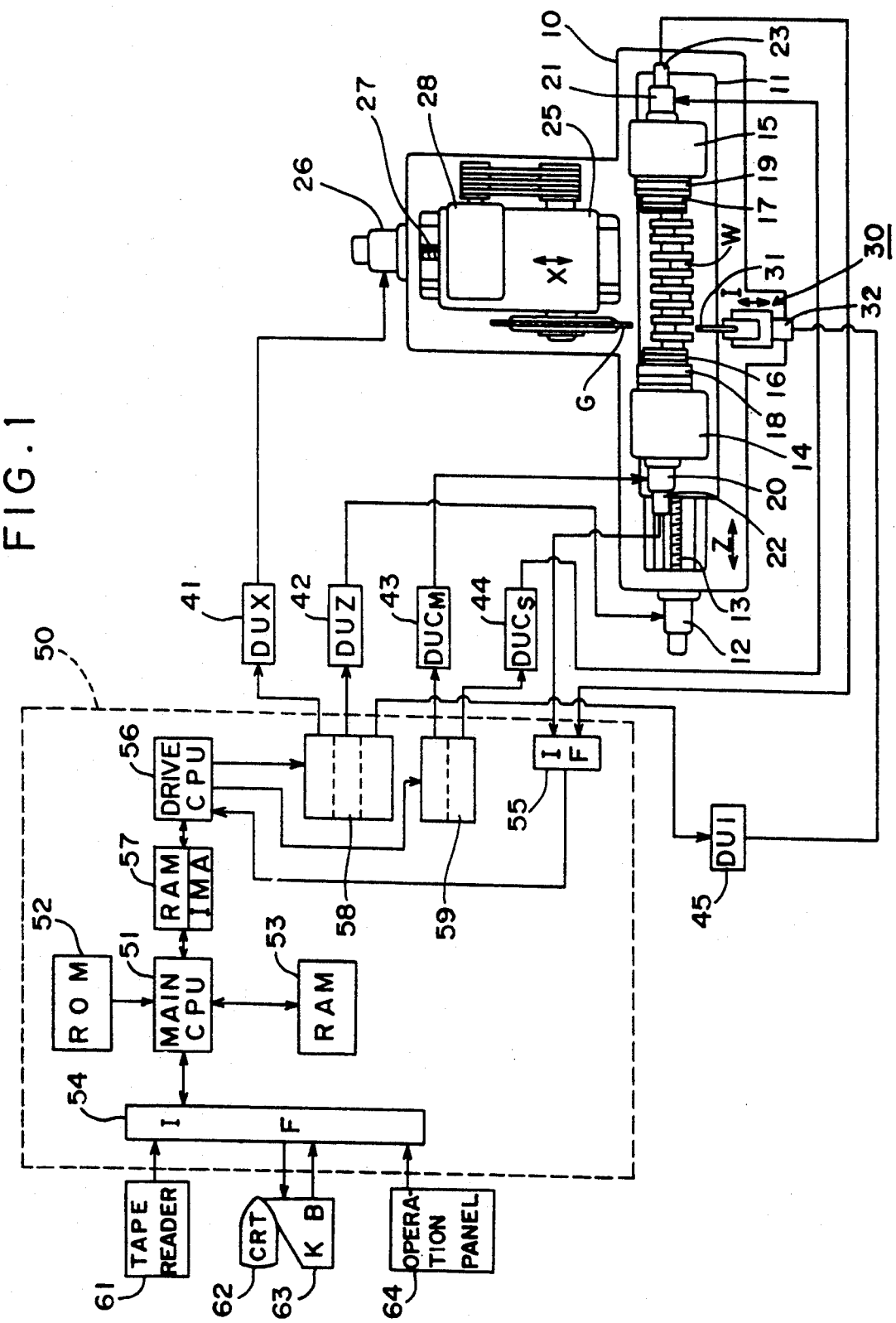
FIG. 1 is a schematic plan view of a pin grinder combined with a block diagram of a control apparatus according to the present invention.
Figure 4A:
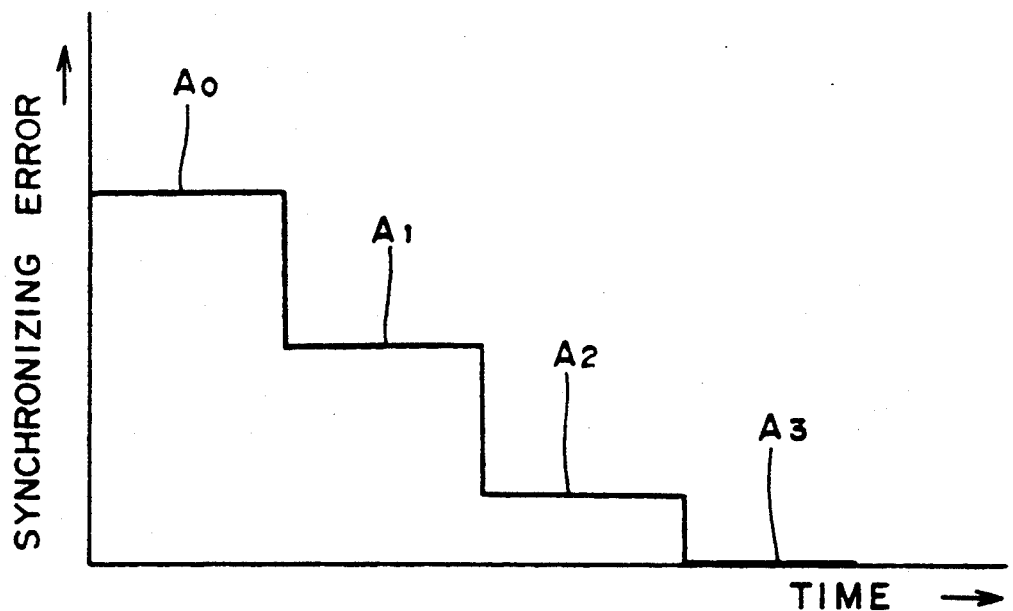
Figure 4B:
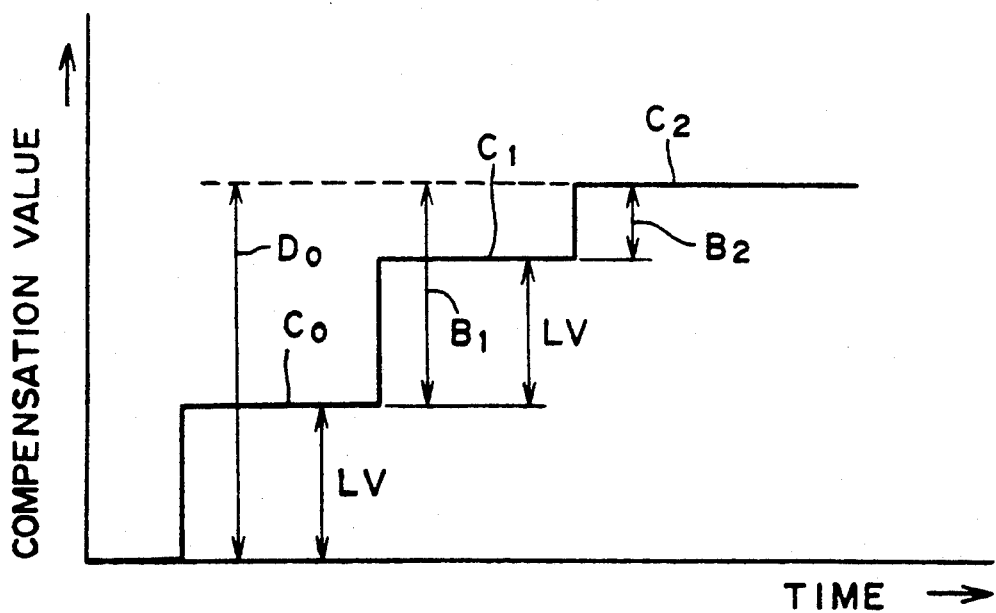
Figure 5:
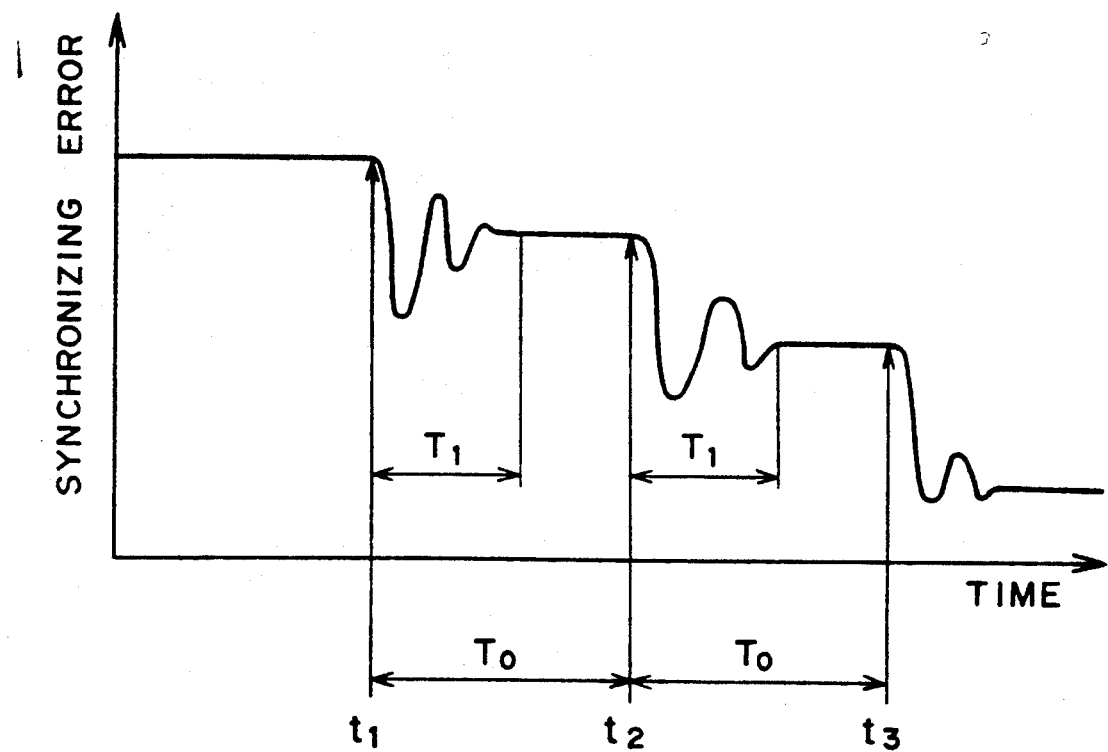

FIGS. 4(a) and 4(b) are explanatory charts showing a relationship between a change in a synchronizing error and a change in a compensation value corresponding thereto; and FIG. 5 is an explanatory chart showing a change in a synchronizing error of the slave spindle shown in FIG. 1.

DETAILED DESCRIPTION OF THE PREFERRED EMBODIMENT

Referring now to the drawings and particularly, to FIG. 1 thereof, a pin grinder provided with a synchronizing control apparatus according to the present invention is shown.

A table 11 is guided on a bed 10 of the grinder at its front side to be movable in a Z-axis direction (lateral direction in FIG. 1). The table 11 is moved by a feed screw which is rotated by a servomotor 12 fixed to a lateral side of the bed 10. A pair of spindle heads 14 and 15 are mounted on both lateral ends of the table 11. A pair of main spindles 18 and 19 having eccentric chuck devices 16 and 17 are supported by the spindle heads 14 and 15 to be rotated by spindle motors 20 and 21 in the form of servomotors, respectively. Rotary encoders 22 and 23 are attached, as angular position sensors, to respective spindle motors 20 and 21 so as to detect rotational positions of the main spindles 18 and 19. A crankshaft of an engine is supported as a workpiece W, with its journal portions located opposite ends being held by the eccentric chuck devices 16 and 17, in order to be rotated about the axis of a pin portion to be machined. The left-side main spindle 18 is hereinafter referred to as master main spindle, and the right-side main spindle 19 is hereinafter referred to as slave main spindle. The rotation of the slave main spindle 19 is controlled so as to follow the master main spindle 18. Therefore, the master main spindle 18 and the slave main spindle 19 are rotated as if one spindle.

On the other hand, a wheel head 25 is guided on the rear side of the bed 1 to be movable in an X-axis direction perpendicular to the rotational axis of the main spindle 18. The wheel head 25 is moved by a servomotor 26 attached to the back surface of the bed 10 through a feed screw 27. A grinding wheel G is supported on the grinding head 25 to be rotated by a grinding wheel drive motor 28 about an axis parallel to the main spindle 18.

Further, a rest device 30 is mounted on the front side of the bed 10 in order to face the pin portion of the workpiece W to be ground. The contacting shoe 31 of the rest device 30 is moved toward the grinding wheel G in an I-axis parallel to the X-axis by a servomotor 32 so as to contacts with the pin portion to be ground, thereby deflection of the workpiece W being eliminated.

The servomotors 12, 26 and 32 and the spindle motors 20 and 21 are connected to the servomotor driving circuits 41 through 45 so as to be rotated in accordance with command signals from the numerical control apparatus (NC controller) 50.

The numerical control apparatus 50 is provided with a main CPU 51, a ROM 52 memorizing a control program, a RAM 53 memorizing NC data etc, and an interface circuit 54, to which a tape reader 61, a CRT display apparatus 62, a keyboard 63 and an operation panel 64 are connected. In addition to the main CPU 51, the numerical control apparatus 50 is provided with a drive CPU 56, which is connected to the main CPU 51 through a RAM 57. Also, detection signals from the rotary encoders 22 and 23, which detect rotational angle positions of the main spindles 18 and 19, are input to the drive CPU 56 through an interface circuit 55. The drive CPU 56 is connected to a pulse distribution circuit 58 and a digital-to-analog converting circuit 59 (hereinafter referred to as D/A converting circuit). The pulse distribution circuit 58 distributes command pulses to the dive circuits 41, 42 and 45 in accordance with pulse distribution commands output by the drive CPU 56. On the other hand, the D/A converting circuit 59 converts digital command values to analog command signals, which are output to the drive circuits 43 and 44. The drive circuits 41, 42 and 45 rotate the servomotor 12, 26 and 32, respectively, in accordance with the command pulses output from the pulse distribution circuit 58, so that the table 11, the wheel head 25 and the contacting shoe 31 are moved by programmed amounts. The drive circuits 43 and 44 rotate the servomotors 20 and 21, respectively, at speeds corresponding to analog command signals output from the D/A converting circuit 59.

Figure 2:
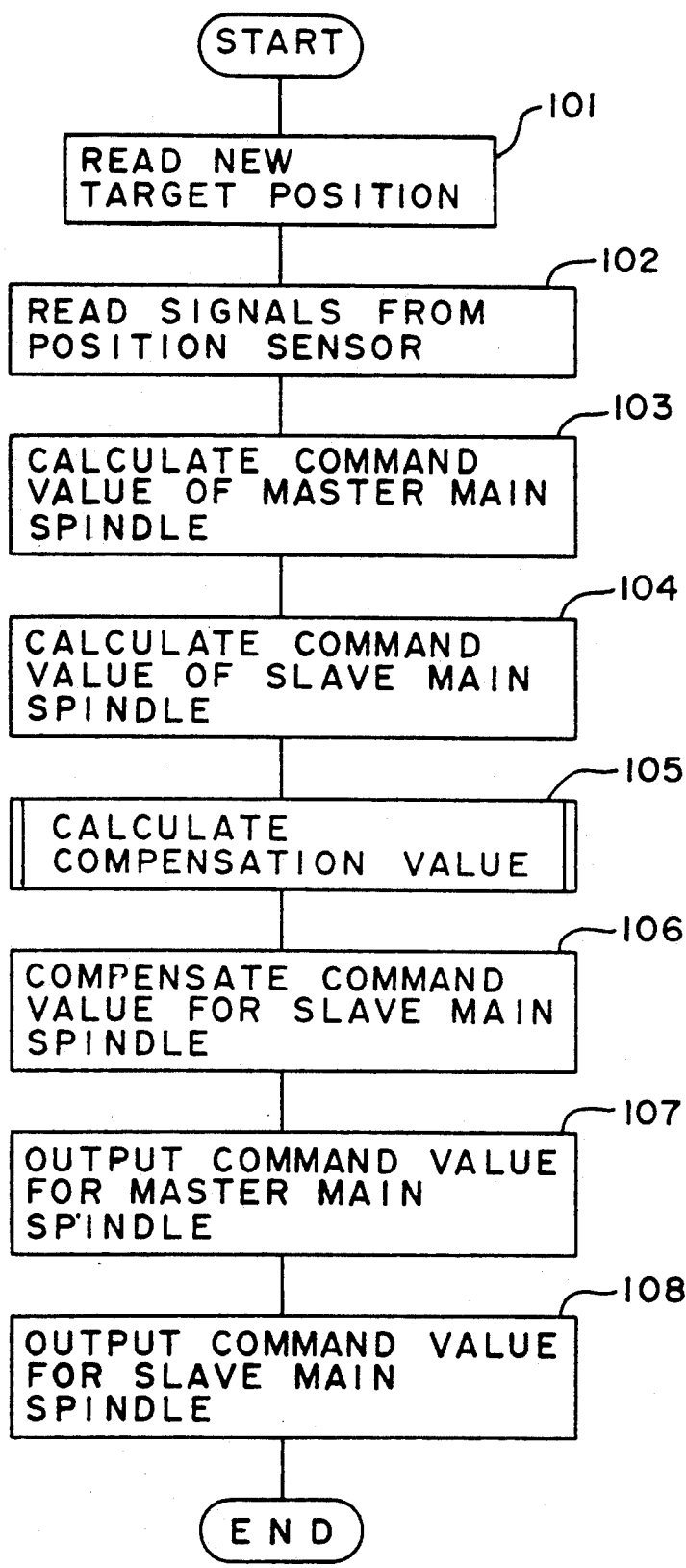
FIG. 2 is a general flow chart illustrating the operation of the drive CPU shown in FIG. 1.

The main CPU 51 executes an interpolation in accordance with the NC data stored in the RAM 53 so as to obtain a series of target positions to which the main spindles 18 and 19 have to reach. The series of the target positions are sequentially output from the main CPU 51 to a target position area of the RAM 53. On the other hand, the drive CPU 56 executes a synchronizing control program as shown in FIG. 2 at a predetermined time interval, for example, 10 milliseconds.

At a first step 101 of the control program, a new target position is read from the target position area of the RAM 57 by the drive CPU 56, and position signals output from the rotary encoders 22 and 23 are read at step 102 in order to detect present positions of the master and slave main spindles 18 and 19. Thereafter, the positional differences between the new target angular position and the present angular positions of the master and slave main spindle 18 and 19 are calculated at steps 103 and 104, respectively. These calculated positional difference are regarded as command values. At the next step 105, a compensation value is calculated based upon a synchronizing error between the master main spindle 18 and the slave main spindle 19.

At step 106, the calculated compensation value is added to the command value for the slave main spindle 19 calculated at the step 104 so as to obtain a compensated command value. Thereafter, at step 107, the command value for the master main spindle 18 calculated at the step 103 is output to the dive circuit 43 through the D/A converting circuit 59 as it is, in order to rotate the master main spindle 18 at a speed corresponding to the command value. At step 108, the compensated command value calculated at the step 105 is output to the drive circuit 44 through the D/A converting circuit 59 in order to rotate the slave main spindle 19 at a speed corresponding to the compensated command value.

Figure 3:
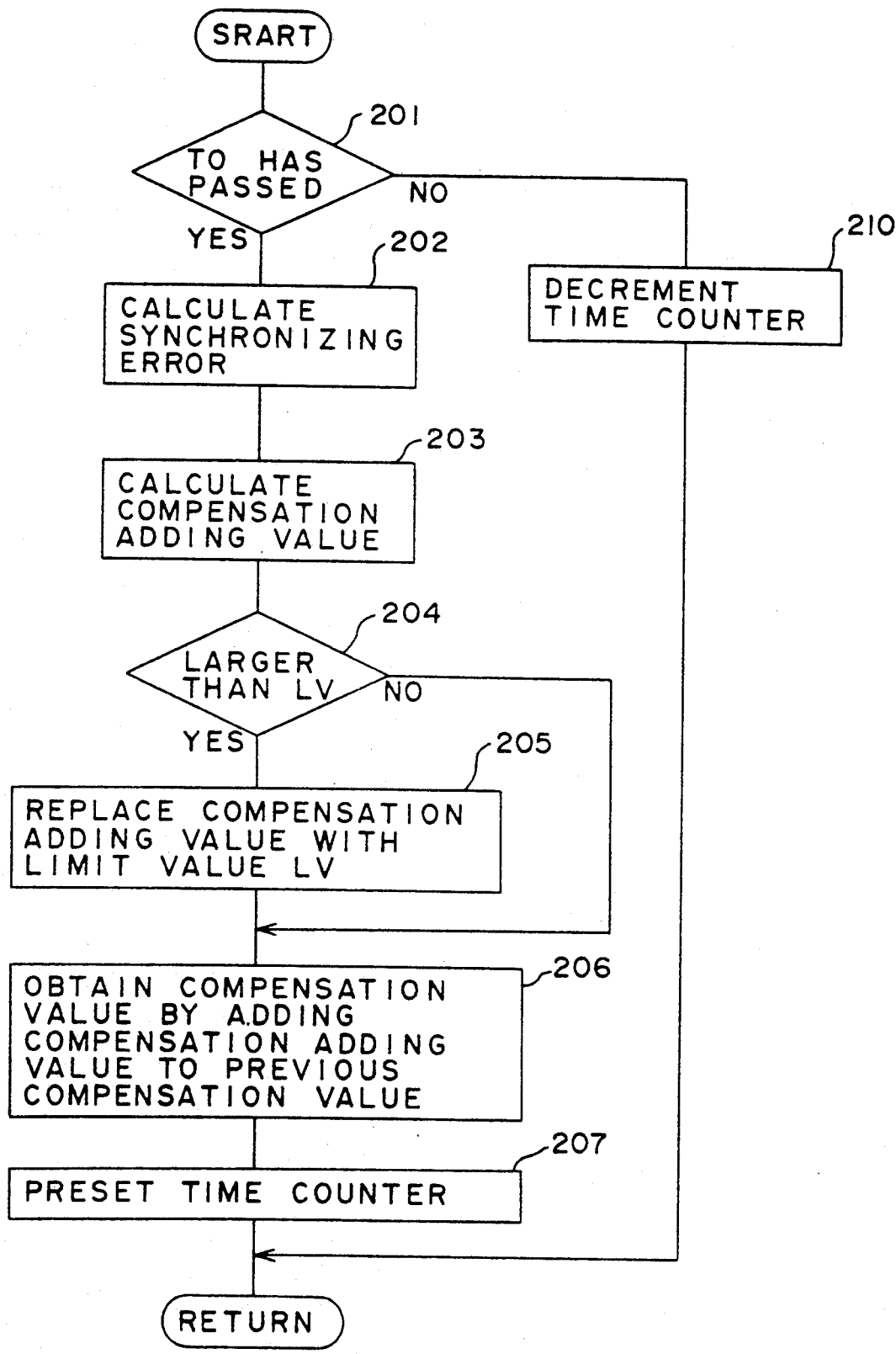
FIG. 3 is a detailed flow chart illustrating a detailed operation of the drive CPU at step 105 shown in FIG. 2.

FIG. 3 is a detailed flow chart showing the compensation value calculation process in the step 105. In this process, calculation of the compensation value and renewal thereof are executed at a predetermined time interval. In this embodiment, data for setting the time interval is input from the keyboard 63, in order to be memorized in an interval memorizing area IMA of the RAM 57.

At a first step 201 shown in FIG. 3, it is judged whether or not a predetermined time period corresponding to the time interval has passed by checking the contents of the time counter TC (not shown). As will be explained later, the time counter is preset, at step 207, to a predetermined initial value corresponding to the time interval memorized in the memory area IMA of the RAM 57. If the contents of the time counter TC is not zero, it is judged that the predetermined time has not passed yet, and the process goes to step 210. As a result, the time counter TC is incremented before returning back to the main routine. When the content of the time counter becomes zero after repeated executions of the step 210, it is judged at the step 201 that the predetermined time period has passed, and the process goes to step 202.

At the step 202, a synchronizing error between the main and slave main spindles is calculated depending upon the angular positions read at the step 102 from the rotary encoders 22 and 23. Thereafter, a compensation adding value is calculated at step 203 based upon the synchronizing error. The compensation adding value is a value obtained by multiplying the synchronizing error by a constant. Therefore, the compensation adding value can be positive and negative.

At step 204, the compensation adding value is compared with a predetermined limit value LV, which is input to the main CPU through the keyboard 63 in order to be stored in the RAM 57. The limit value LV indicates an allowable maximum change of the compensation value within the time interval. If the calculated compensation adding value is larger than the limit value, the process goes to step 205 in order to replace the compensation adding value calculated at the step 203 with the predetermined limit value LV, so that the limit value LV is regarded as the compensation adding value. Thereafter, the process goes to step 206. On the other hand, if the calculated compensation adding value is equal to or smaller than the limit value, the process goes directly to the step 206.

At the step 206, a new compensation value is obtained by adding the compensation adding value to the previous compensation value. Thereafter, the process goes to the step 106 in FIG. 2 after decrementing the time counter TC at step 207.

The new compensation value calculated by the process shown in FIG. 3 is used at the step 106 in order to compensate the command value for the slave main spindle 19. As a result, the slave main spindle 19 is rotated at a speed corresponding to the compensated command value while the master main spindle 18 is rotated at a speed corresponding to the command value, thereby the master and slave main spindles 18 and 19 being synchronized.

FIG. 4(a), (b) are charts showing the changes of the synchronizing error and the compensation value. The compensation value is renewed at a predetermined interval as explained above.

If the compensation value is zero and the synchronizing error has a value of A0 at the initial state of the synchronizing control, the compensation value D0 calculated at step 203 based upon the synchronizing error A0 becomes larger than the limit value LV. In this case, however, the compensation value D0 is replaced with the limit value LV at the step 205. As a result, the limit value LV becomes a final compensation adding value C0. Since the initial compensation value is zero in this case, the value C0 becomes a final compensation value by which the command value for the slave main spindle 19 is compensated. When the command value for the slave main spindle 19 is compensated by the final compensation value C0, the synchronizing error decreases from A0 to A1. Even after this compensation, the compensation adding value B1 calculated from the synchronizing error A1 becomes larger than the limit value LV. Therefore, the limit value LV is again used as a final adding value for the calculation of the compensation value. As a result, a value C1 obtained by adding the limit value LV to the previous compensation value C0 is now used as a final compensation value in order to reduce the synchronizing error. By this renewal of the compensation value, the synchronizing error is reduced from A1 to A2.

In a third compensation process, a compensation adding value B2 calculated from the synchronizing error A2 becomes smaller than the limit value LV. Therefore, the calculated compensation adding value B2 is used as it is for the calculation of the final compensation value C2. Namely, the final compensation value C2 in the third compensation process is obtained by adding the compensation adding value B2 to the previous compensation value C1. This calculation is expressed by the equation of $C2=C1+B2$.

By the operation described above, the compensation adding values are cumulated in order to obtain a new compensation value. For example, the compensation value C2 is calculated by the equation of $C2=D0=(LV+LV+B2)$. Since the compensation adding values are cumulatively added to the compensation value until the synchronizing error becomes zero, the compensation value finally becomes a value which can reduce the synchronization error to zero. If the compensation value becomes too large, the compensation adding value becomes negative in order to reduce the synchronizing error.

By changing the compensation value step by step as shown in FIG. 4(b), it is possible to minimize the residual synchronizing error, which is produced due to stiffness of the machine and the servo loop therefor and the like, thereby the synchronizing accuracy being improved.

Moreover, since the change of the compensation value is restricted within the limit value LV, the command value for the slave main spindle is gradually compensated, even if a large synchronizing error is produced, in order to minimize the disturbance of the spindle motor 21. Therefore, it is possible to improve the synchronizing accuracy.

FIG. 5 is a chart showing the change of the synchronizing error. As explained above, the compensation value is renewed at an interval T0, which has input from the keyboard 63. When the compensation value is renewed, the servo loop for the slave main spindle 19 falls into an instable condition for a period T1 until the synchronizing error becomes a value corresponding to the new compensation value. A similar instable condition also occurs in the servo loop for the master main spindle 18. Since the main and slave main spindles 18 and 19 are connected mechanically through the workpiece W, the both main spindles 18 and 19 interfere each other, thereby the left-side spindle motor 20 also falling into a hunting condition. This transitional hunting condition decrease in a short period, after which the servo loops move to stable conditions.

Since, in the above embodiment, the compensation value is renewed at the interval T0 longer than the instable period T1 of the servo loop, a new compensation adding value is calculated based upon a synchronizing error detected in the stable condition. Accordingly, it is possible to prevent the apparatus from calculating the compensation value adding value based upon a synchronizing error detected in the instable condition, wherein the left-side and right-side main spindles 18 and 19 are in instable conditions such as hunting conditions. Therefore, it is possible to eliminate the hunting conditions, and thereby to reduce time wherein the left-side and right-side main spindles 18 and 19 are in instable conditions.

The interval T0 is set at, for example, 100 through 200 milliseconds. Since the command values are output from the drive CPU 56 to the D/A converting circuit 58, at steps 107 and 108, every 10 milliseconds, the compensation value is renewed whenever 10 through 20 command values are output to the D/A converting circuit 58.

The length T1 of the instable condition changes depending upon the weight and inertia moment of the workpiece W supported between the left-side and right-side main spindles 18 and 10. Accordingly, an ideal synchronizing control can be realized by setting an optimum time interval for the renewal process through the keyboard 63.

Although, in the above embodiment, the synchronizing control apparatus is used for synchronizing rotations of the left-side and right-side main spindles of a pin grinder, it is obvious that the present invention can be used for synchronizing two non-connected spindles, such as a wheel spindle supporting a grinding wheel and a work spindle supporting a workpiece of a gear grinder or a cam grinder and the like, in which the grinding wheel and the workpiece are rotated synchronously.

Obviously, numerous modifications and variations of the present invention are possible in light of the above teachings. It is therefore to be understood that within the scope of the appended claims, the present invention may be practiced otherwise than as specifically described herein.

What is claimed is:

1. A synchronizing control apparatus for synchronously controlling a first rotary spindle engaged with one end of a rotary member and a second rotary spindle engaged with the other end of said rotary member, said synchronizing control apparatus comprising:
   a pair of servomotors for driving said two spindles, respectively;
   a pair of drive circuit means for driving said pair of servomotors in accordance with a command value;
   synchronizing error detecting means for detecting a synchronizing error based upon an angular position difference between said two rotary spindles;
   comparing means for comparing said detected synchronizing error with a predetermined limit value;
   limiting means for regarding said synchronizing error as a compensation adding value when said synchronizing error is smaller than said predetermined limit value and for regarding said limit value as said compensation adding value when said synchronizing error is larger than said limit value;
   compensation value calculating means for adding said compensation adding value to a previous compensated command value in order to obtain a new compensated command value; and
   control means for outputting said command value to one of said drive circuit means and for outputting said compensated command value to the other of said drive circuit means.

2. A synchronizing control apparatus set forth in claim 1, wherein said synchronizing error detecting means comprises:
   a pair of angular position sensors for detecting angular position of said two spindles; and
   calculation means for calculating a difference between the angular position detected by said angular position sensors.

3. A synchronizing control apparatus set forth in claim 2, wherein said comparing means further comprises limit value setting means for inputting and storing said limit value.

4. A synchronizing control apparatus set forth in claim 1, wherein said synchronizing error detecting means, said comparing means, said limiting means, compensation value calculating means and said control means operate at a predetermined time interval larger than a time length of instable condition of said other drive circuit means.

5. A method for synchronously rotating two rotary spindles by a pair of servomotors to rotate a common member at a predetermined speed, wherein said method comprises steps of:
   outputting a pair of command values corresponding to said predetermined speed to a pair of drive circuits driving said pair of servomotors, respectively;
   detecting a synchronizing error based upon an angular position difference between said two rotary spindles;
   comparing said detected synchronizing error with a predetermined limit value;
   regarding said synchronizing error as a compensation adding value when said synchronizing error is smaller than said predetermined limit value and regarding said limit value as said compensation adding value when said synchronizing error is larger than said limit value;
   adding said adding compensation value to said command value output to one of said drive circuits; and
   repeating said detecting step through said adding step at a predetermined time interval.

6. A method for synchronously rotating two rotary spindles set forth in claim 5, wherein said steps are repeated at a predetermined time interval larger than a time length of instable condition of said one of drive circuits.

7. A synchronizing control apparatus for synchronously controlling a master main spindle and a slave main spindle of a pin grinder, wherein said master main spindle is engaged with one end of a workpiece and said slave main spindle is engaged with the other end of said workpiece to rotate said workpiece, said synchronizing control apparatus comprising:
   a pair of servomotors for driving said master main spindle and said slave main spindle, respectively;
   a pair of angular position sensors for detecting angular positions of said master main spindle and said slave main spindle, respectively;
   a pair of drive circuit means for driving said pair of servomotors in accordance with a command value;
   synchronizing error detecting means for detecting a synchronizing error of said slave main spindle with respect to said master main spindle based upon angular positions of said master and slave main spindles detected by said pair of angular position sensors;

comparing means for comparing the detected synchronizing error with a predetermined limit value;

limiting means for regarding said synchronizing error as a compensation adding value when said synchronizing error is smaller than said predetermined limit value and for regarding said limit value as said compensation adding value when said synchronizing error is larger than said limit value;

compensation value calculating means for adding said compensation adding value to a previous compensated command value in order to obtain a new compensated command value; and outputting means for outputting said command value to one of said drive circuit means and for outputting said compensated command value to the other of said drive circuit means;

wherein said control means includes means for renewing said compensated command value at a predetermined time interval larger than a time length of instable condition of said other drive circuit means.

8. A synchronizing control apparatus for synchronously controlling a master main spindle and a slave main spindle of a machine tool, wherein said master main spindle is engaged with one end of a workpiece and said slave main spindle is engaged with the other end of said workpiece to rotate said workpiece, said synchronizing control apparatus comprising:

a pair of servomotors for driving said master main spindle and said slave main spindle, respectively;

a pair of angular position sensors for detecting angular positions of said master main spindle and said slave main spindle, respectively;

a pair of drive circuit means for driving said pair of servomotors in accordance with a command value;

synchronizing error detecting-means for detecting a synchronizing error of said slave main spindle with respect to said master main spindle based upon angular positions of said master and slave main spindles detected by said pair of angular positions sensors;

comparing means for comparing the detected synchronizing error with a predetermined limit value;

limiting means for regarding said synchronizing error as a compensation adding value when said synchronizing error is smaller than said predetermined limit value and for regarding said limit value as said compensation adding value when said synchronizing error is larger than said limit value;

compensation value calculating means for adding said compensation adding value to a previous compensated command value in order to obtain a new compensated command value; and outputting means for outputting said command value to one of said drive circuit means for outputting said compensated command value to the other of said drive circuit means, wherein said control means includes means for renewing said compensated command value at a predetermined time interval larger than a time length of instable condition of said other drive circuit means.

* * * * *